US012305556B2

(12) United States Patent
Lohmann et al.

(10) Patent No.: US 12,305,556 B2
(45) Date of Patent: May 20, 2025

(54) EXHAUST GAS SAMPLE COLLECTOR AND MIXER FOR AFTERTREATMENT SYSTEM

(71) Applicant: DEERE & COMPANY, Moline, IL (US)

(72) Inventors: Craig W. Lohmann, Cedar Falls, IA (US); Austin G. Richardson, South Weber, UT (US)

(73) Assignee: DEERE & COMPANY, Moline, IL (US)

( * ) Notice: Subject to any disclaimer, the term of this patent is extended or adjusted under 35 U.S.C. 154(b) by 9 days.

(21) Appl. No.: 18/186,894

(22) Filed: Mar. 20, 2023

(65) Prior Publication Data

US 2023/0228207 A1    Jul. 20, 2023

Related U.S. Application Data

(63) Continuation of application No. 17/332,592, filed on May 27, 2021, now Pat. No. 11,629,623.

(51) Int. Cl.
*F01N 3/20*    (2006.01)
*B01D 53/94*    (2006.01)
*F01N 3/28*    (2006.01)

(52) U.S. Cl.
CPC ......... *F01N 3/208* (2013.01); *B01D 53/9418* (2013.01); *B01D 53/9495* (2013.01); *F01N 3/2066* (2013.01); *F01N 3/2892* (2013.01); *F01N 2610/1453* (2013.01); *F01N 2900/14* (2013.01)

(58) Field of Classification Search
CPC ........... F01N 2560/026; F01N 2610/02; F01N 2610/1453; F01N 2900/14; F01N 3/2066; F01N 3/208; F01N 3/2892; Y02T 10/12; B01D 2251/2062; B01D 2251/2067; B01D 2255/20723; B01D 2255/20738; B01D 2255/20761; B01D 2255/50; B01D 2255/91; B01D 53/90; B01D 53/9418; B01D 53/9477
See application file for complete search history.

(56) References Cited

U.S. PATENT DOCUMENTS

| | | |
|---|---|---|
| 8,341,936 B2 | 1/2013 | Zhang |
| 8,756,913 B2 | 6/2014 | Liu et al. |
| 8,800,264 B2 | 8/2014 | Sullivan et al. |
| 10,066,535 B2 | 9/2018 | Yi et al. |
| 2007/0204597 A1 | 9/2007 | Nakano |
| 2007/0214862 A1* | 9/2007 | Kubinski ............... F01N 13/18 |
| | | 73/1.06 |

(Continued)

FOREIGN PATENT DOCUMENTS

| | | | |
|---|---|---|---|
| DE | 102015224460 A1 * | 6/2017 | |
| DE | 102006029631 | * 5/2019 | |
| WO | 2016039720 A | 3/2016 | |

*Primary Examiner* — Phutthiwat Wongwian
*Assistant Examiner* — Diem T Tran
(74) *Attorney, Agent, or Firm* — Michael Best & Friedrich LLP

(57) ABSTRACT

An exhaust gas sample collector includes a tubular body, a plurality of inlet openings circumferentially spaced about an outer periphery of the tubular body, the plurality of inlet openings configured to receive exhaust gas, an outlet in fluid communication with the plurality of inlet openings, and a sensor configured to measure a characteristic of the exhaust gas at the outlet.

18 Claims, 5 Drawing Sheets

(56) References Cited

U.S. PATENT DOCUMENTS

| | | |
|---|---|---|
| 2011/0146247 A1 | 6/2011 | Nalla et al. |
| 2013/0125533 A1 | 5/2013 | Sullivan et al. |
| 2015/0078976 A1 | 3/2015 | Bui |
| 2016/0349227 A1 | 12/2016 | Pemna et al. |
| 2017/0219513 A1 | 8/2017 | Kayama et al. |
| 2017/0314447 A1 | 11/2017 | Zhang |
| 2018/0313780 A1* | 11/2018 | Weber ................ G01N 27/4077 |
| 2022/0235688 A1* | 7/2022 | Venkatesan ............. F01N 11/00 |

* cited by examiner

EXHAUST GAS SAMPLE COLLECTOR AND MIXER FOR AFTERTREATMENT SYSTEM

CROSS-REFERENCE TO RELATED APPLICATIONS

This application is a continuation of U.S. patent application Ser. No. 17/332,592, filed May 27, 2021, the entire content of which is incorporated herein by reference.

BACKGROUND

The present disclosure relates to exhaust gas treatment systems, and more particularly, to exhaust gas treatment systems including one or more sensors for measuring aspects of the exhaust gas.

Diesel exhaust is typically subject to emissions regulations covering a variety of emission components, including particulate matter and nitrogen oxides ($NO_x$). A variety of exhaust treatment devices have been developed to reduce these emission components. For example, a diesel particulate filter (DPF) can be used to trap diesel particulate matter and oxidize soot, and a selective catalytic reduction (SCR) element can be used to convert the $NO_x$ present in exhaust gas into other compounds, such as nitrogen, water, and carbon dioxide. Typically, diesel exhaust fluid (DEF) is injected upstream of the SCR element to provide ammonia, which acts as a reducing agent and reacts with the $NO_x$ in the presence of the SCR catalyst. A selective catalytic reduction on filter (SCR+F) element combines SCR and DPF functionality such that $NO_x$ reduction and particulate matter filtration and oxidation can occur in a single element. One or more treatment devices may provided downstream of the engine to form an exhaust gas treatment system, also known as an aftertreatment system.

SUMMARY

The present disclosure provides, in one aspect, an exhaust gas treatment system including an exhaust gas pathway configured to receive exhaust gas from an internal combustion engine. The exhaust gas treatment system further includes a treatment element configured to reduce an emissions component of the exhaust gas, and a sample collector positioned within the exhaust gas pathway downstream of the treatment element. The sample collector includes a plurality of inlet openings spaced about a periphery of the exhaust gas pathway and configured to receive a sample of exhaust gas from the exhaust gas pathway, and an outlet in fluid communication with the plurality of inlet openings. A sensor located at the outlet of the sample collector is configured to measure a characteristic of the sample.

In some embodiments, the exhaust gas treatment system includes a treatment device having a housing enclosing the treatment element. The housing includes an inlet passage upstream of the treatment element and an outlet passage downstream of the treatment element, and the sample collector is positioned within the outlet passage.

In some embodiments, the sample collector includes a body, a first flange extending from the body, a second flange extending from the body opposite the first flange, and a rib positioned between the first flange and the second flange.

In some embodiments, the first flange, the second flange, and the rib engage an interior wall of the outlet passage such that a first chamber is defined between the first flange and the rib, and a second chamber is defined between the second flange and the rib.

In some embodiments, the rib includes a gap, and the first chamber is in fluid communication with the second chamber through the gap.

In some embodiments, the plurality of inlet openings is formed in the first flange.

In some embodiments, the sample of exhaust gas flows from the plurality of inlet openings into the first chamber, and then into the second chamber through the gap before flowing through the outlet.

In some embodiments, the sample collector includes a torturous flow path from the plurality of inlet openings to the outlet.

In some embodiments, the sensor is a NOx concentration sensor.

In some embodiments, the exhaust gas treatment system further includes a reductant injector configured to inject reductant into the exhaust gas pathway upstream of the treatment element.

In some embodiments, the sample collector includes a tubular collar.

The present disclosure provides, in another aspect, an exhaust gas treatment system including an exhaust gas pathway configured to receive exhaust gas from an internal combustion engine. The exhaust gas treatment system further includes a treatment device with a housing having an inlet passage and an outlet passage, and a collar positioned within the outlet passage such that the collar engages an interior wall of the outlet passage. The collar includes an inlet configured to receive a sample of the exhaust gas and an outlet downstream from the inlet. The collar defines a tortuous pathway from the inlet to the outlet, between the collar and the interior wall. The exhaust gas treatment system further includes a sensor located at the outlet of the collar to measure a characteristic of the sample.

In some embodiments, the sensor is a NOx concentration sensor.

In some embodiments, the tortuous pathway includes a first chamber and a second chamber separated by a rib.

In some embodiments, the rib includes a gap providing fluid communication between the first chamber and the second chamber.

In some embodiments, the sample changes direction at least three times when flowing along the tortuous pathway.

In some embodiments, the inlet is one of a plurality of circumferentially spaced inlets.

In some embodiments, each of the plurality of inlets is in fluid communication with the outlet.

The present disclosure provides, in another aspect, an exhaust gas treatment system including an exhaust gas pathway configured to receive exhaust gas from an internal combustion engine. The exhaust gas treatment system includes a reductant injector configured to inject a reductant into the exhaust gas pathway, a treatment device including an SCR element positioned downstream of the reductant injector, the SCR element configured to reduce NOx from the exhaust gas, and a sample collector positioned within the exhaust gas pathway. The sample collector includes a plurality of inlet openings spaced about a periphery of the exhaust gas pathway and configured to receive a sample of exhaust gas from the exhaust gas pathway, an outlet in fluid communication with the plurality of inlet openings, and a tortuous flow path extending from the plurality of inlet openings to the outlet. A NOx concentration sensor is located at the outlet of the sample collector to measure a NOx concentration of the sample, and a controller is in communication with the NOx concentration sensor and the reductant injector. The controller is configured to control operation of the reductant injector based on feedback from the NOx concentration sensor.

In some embodiments, the sample collector is positioned within an outlet passage of the treatment device.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

Figure 1:
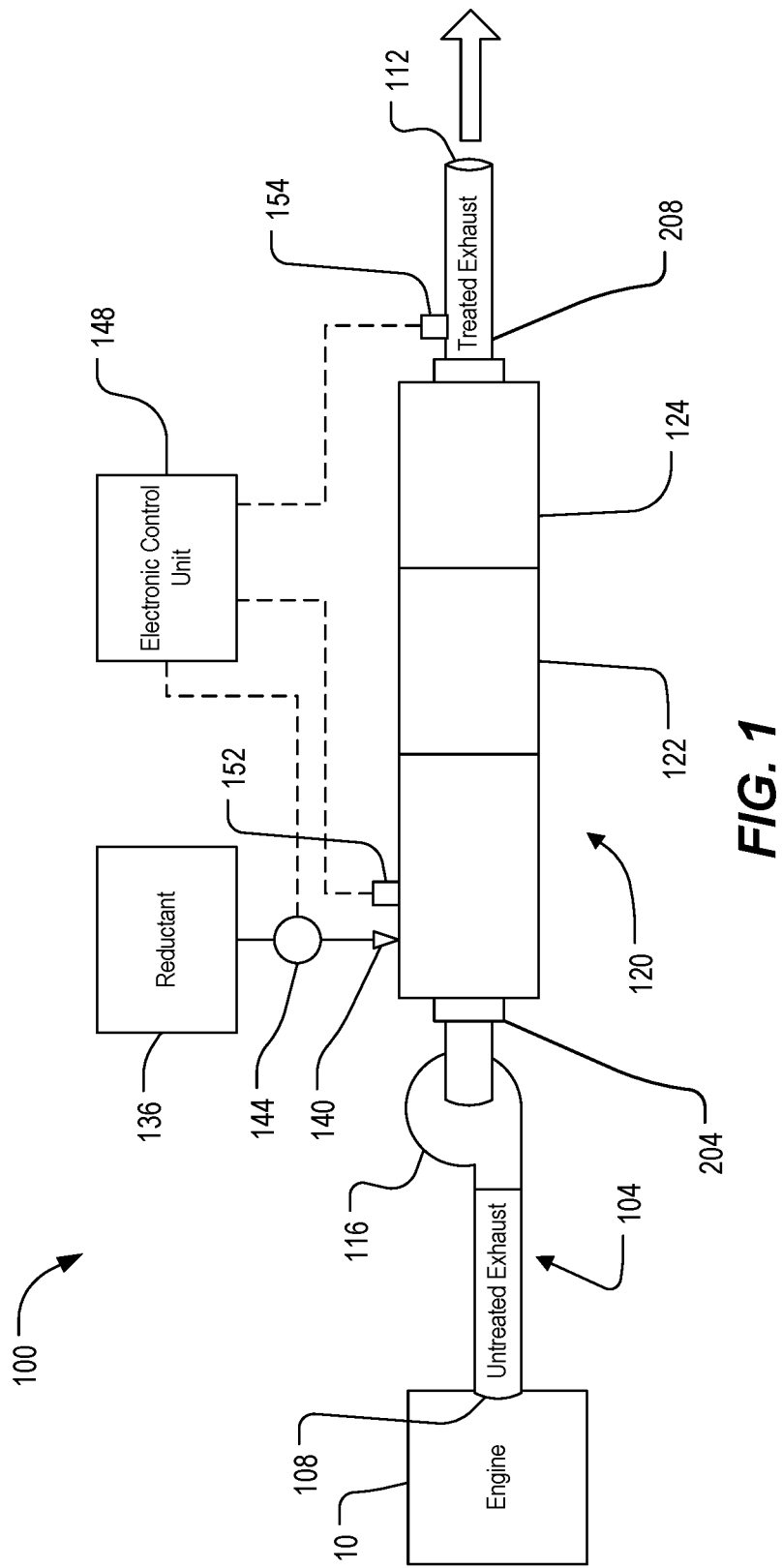
FIG. 1 is a schematic view of an exhaust gas treatment system according to an embodiment of the present disclosure.

FIG. 1 illustrates an exhaust gas treatment system 100 according to an embodiment of the present disclosure, for treating exhaust gas emitted by a diesel-powered internal combustion engine 10. The illustrated exhaust gas treatment system 100 may be used in a wide variety of applications. For example, the exhaust gas treatment system 100 may be incorporated into an agricultural machine, construction machine, passenger vehicle, or any other equipment powered by a diesel engine (e.g., generators, compressors, pumps, and the like).

With continued reference to FIG. 1, the exhaust gas treatment system 100 includes an exhaust pathway 104 (e.g., an exhaust pipe) having an inlet or upstream side 108 and an outlet or downstream side 112. In some embodiments, a turbocharger 116 is disposed in the exhaust pathway 104 proximate the inlet 108, but in alternative embodiments, the turbocharger 116 may be omitted. A treatment device 120 is located along the exhaust pathway 104, between the inlet 108 and the outlet 112.

In the illustrated embodiment, the treatment device 120 includes a first treatment element 122 and a second treatment element 124. The second treatment element 124 is located downstream of the first treatment element 122 in the illustrated embodiment; however, the numeric designations "first," "second," etc. are used herein for convenience and should not be regarded as defining order, quantity, or relative position.

The first treatment element 122 may include a diesel particulate filter (DPF) or a combined selective catalytic reduction and diesel particulate filter (SCR+F) element having a catalytic washcoat and a porous filter substrate. In such embodiments, the washcoat of the SCR+F element may include one or more metal catalysts, such as a copper-based catalyst, an iron-based catalyst, or a vanadium-based catalyst. Alternatively, other washcoats (e.g., zeolite-based) may be used. The first treatment element 122 preferably captures particulate matter, oxidizes soot, and, in some embodiments, reduces $NO_x$ from exhaust gas passing through the first treatment element 122.

The second treatment element 124 may include a selective catalytic reduction (SCR) element and/or an ammonia oxidation catalyst (AOC). The SCR element may include, for example, a catalytic washcoat on a monolithic support material, such as ceramic. The washcoat may include one or more metal catalysts, such as a copper-based catalyst, an iron-based catalyst, or a vanadium-based catalyst. Alternatively, other washcoats (e.g., zeolite-based) may be used. The SCR element reduces $NO_x$ from exhaust gas passing through it. The AOC converts excess ammonia leaving the SCR element to nitrogen and water. In embodiments in which the second treatment element 124 includes both an SCR element and an AOC, the SCR element and the AOC are preferably positioned in series, with the AOC located downstream of the SCR element. In some embodiments, the AOC may be provided as a separate treatment element positioned downstream of the second treatment element 124. In some embodiments, the exhaust gas treatment system 100 may include one or more additional treatment elements, such as a diesel oxidation catalyst (DOC), $NO_x$ storage catalyst, passive $NO_x$ adsorber (PNA), or the like.

With continued reference to FIG. 1, the exhaust gas treatment system 100 further includes a reductant supply 136 and a reductant injector 140 in fluid communication with the reductant supply 136 via a distributor 144. The reductant supply 136 includes a reservoir for storing a reductant, such as diesel exhaust fluid (DEF) or ammonia. The distributor 144 includes one or more pumps, valves, or the like to selectively control the flow of reductant from the reductant supply 136 to the injector 140. The reductant injector 140 is positioned to introduce reductant into the treatment device 120 upstream of the first treatment element 122. In some embodiments, one or more flow affecting features (e.g., fins, vanes etc.) may be provided downstream of the reductant injector 140 to enhance mixing.

An electronic control unit (ECU 148) actively controls various aspects of the operation of the exhaust gas treatment system 100. The ECU 148 preferably includes, among other things, an electronic processor, non-transitory, machine-readable memory, and an input/output interface. The electronic processor is communicatively coupled to the memory and configured to retrieve from memory and execute, among other things, instructions related to the control processes and methods described herein.

A first sensor 152, which is a temperature sensor in the illustrated embodiment, is disposed upstream of the first treatment element 122. The temperature sensor 152 may be a thermistor, thermocouple, resistance temperature detector, infrared sensor, or any other sensor suitable for measuring the temperature of exhaust gas. All or a portion of the temperature sensor 152 may extend into the exhaust pathway 104 so as to be directly exposed to exhaust gas. Alternatively, the temperature sensor 152 may be located outside the exhaust pathway 104 and measure the temperature of the exhaust gas indirectly (e.g., by measuring the temperature of the exhaust pipe). A second sensor 154, which is a $NO_x$ concentration sensor in the illustrated embodiment, is disposed downstream of the second treatment element 124. The second sensor 154 may additionally or alternatively be configured to measure another characteristic of the exhaust gas, such as ammonia concentration, hydrocarbon concentration, or the like.

The sensors 152, 154 are communicatively coupled to the ECU 148 to provide feedback to the ECU 148. The ECU 148 is communicatively coupled to the distributor 144 to control reductant dosing through the injector 140 in response to feedback from one or both sensors 152, 154. The ECU 148 may also be configured to communicate with external systems including, for example, engine controls and/or vehicle controls.

Figure 2:
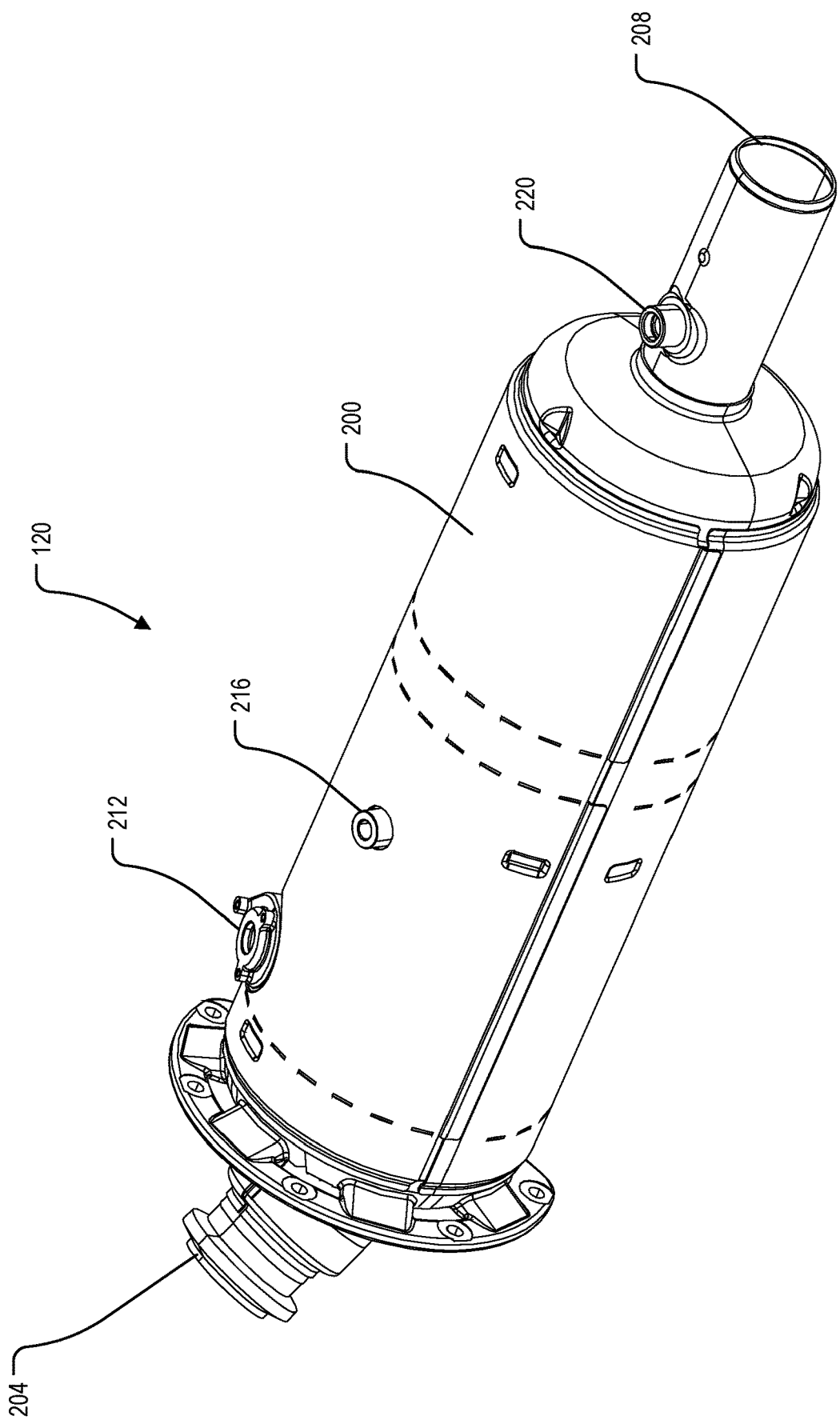
FIG. 2 is a perspective view of a treatment device of the exhaust gas treatment system of FIG. 1.
Figure 3:
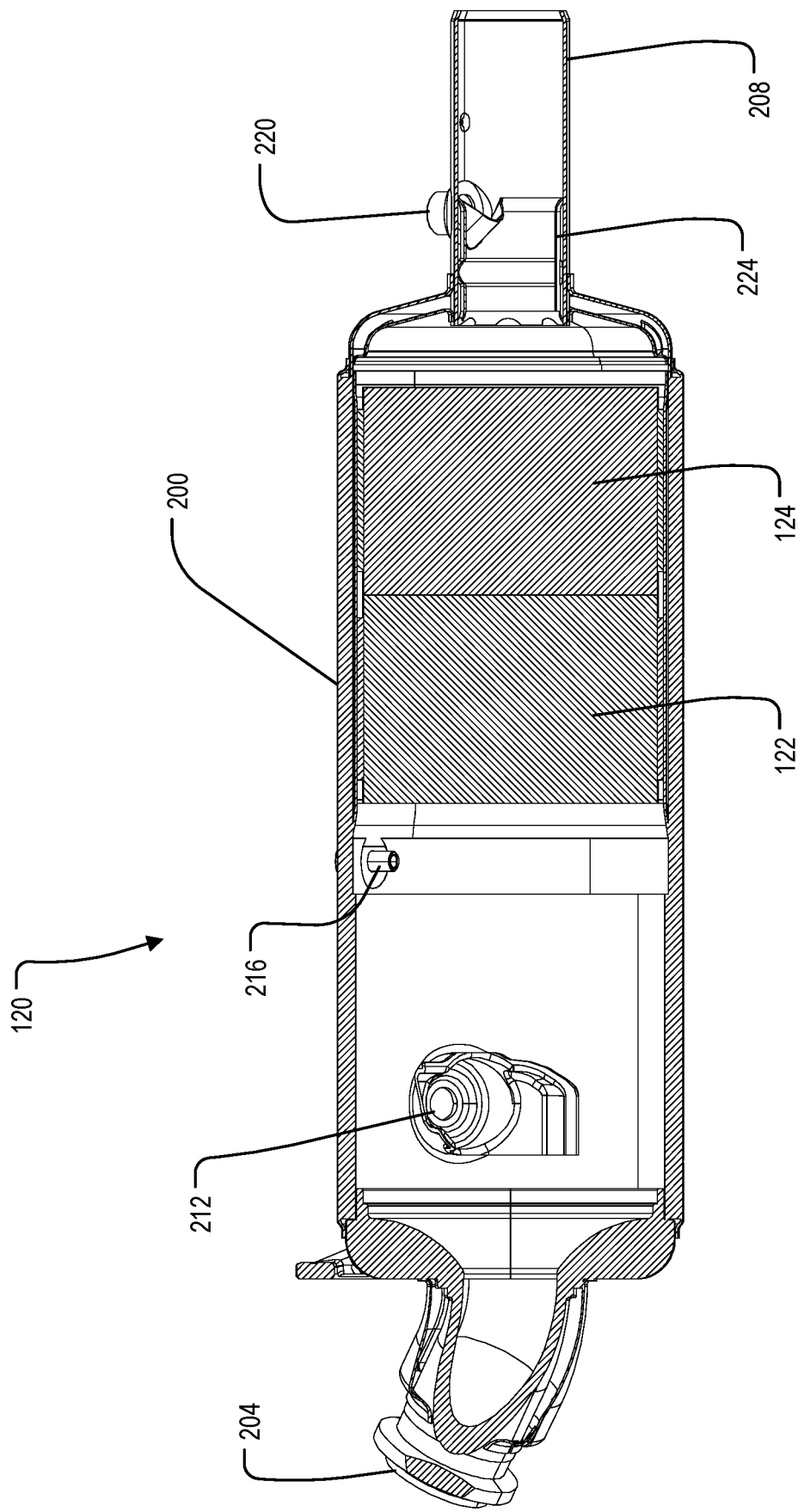
FIG. 3 is a cross-sectional view of the treatment device of FIG. 2.

FIGS. 2 and 3 illustrate an embodiment of the treatment device 120. The treatment device 120 includes a cylindrical housing 200 having an inlet passage 204 and an outlet passage 208 coupled to the exhaust gas pathway 104. An injector port 212, a first sensor port 216, and a second sensor port 220 provide mounting locations and access to the interior of the housing 200 for the reductant injector 140, the temperature sensor 152, and the $NO_x$ concentration sensor 154, respectively.

Figure 4:
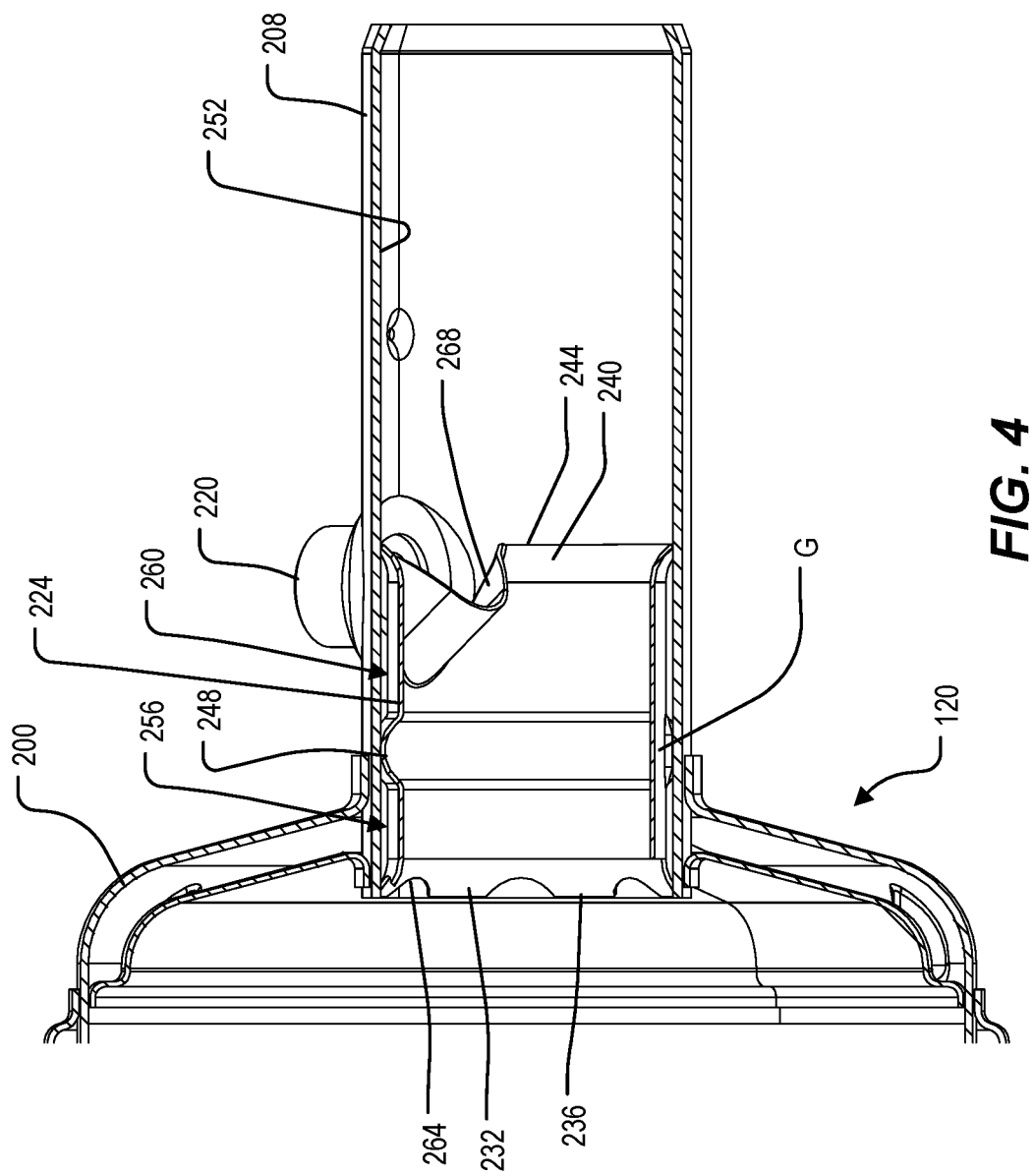
FIG. 4 is an enlarged portion of the cross-sectional view of FIG. 3, illustrating a collar within the treatment device.
Figure 6:
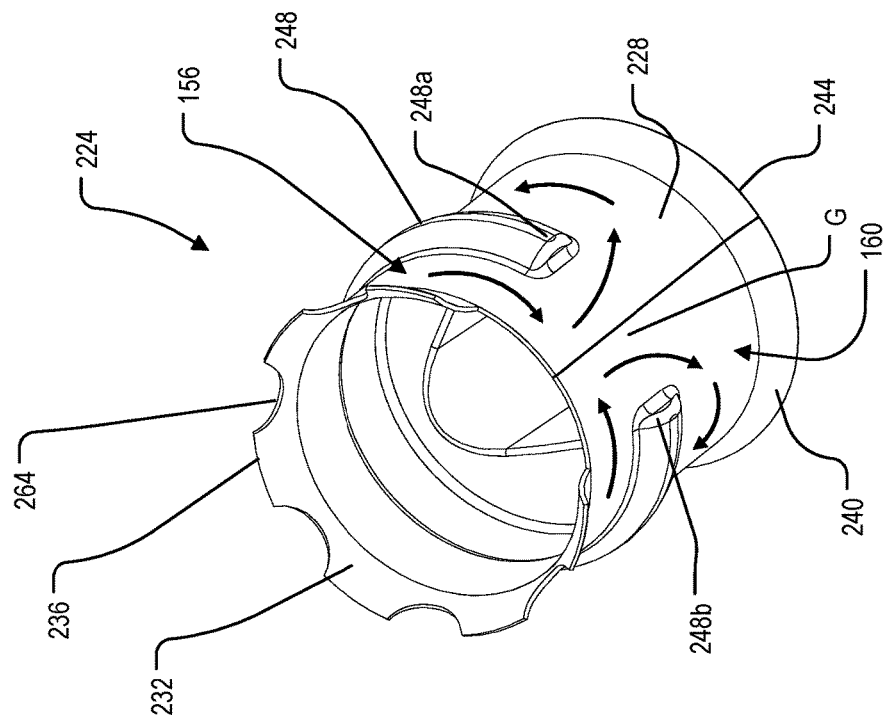
FIG. 6 is another perspective view of the collar of FIG. 4.
Figure 5:
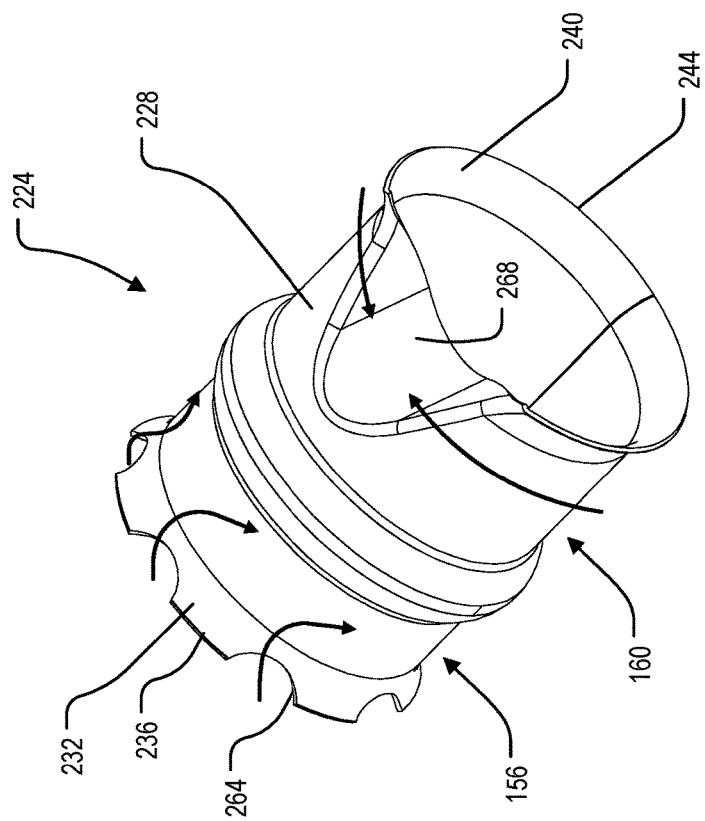
FIG. 5 is a perspective view of the collar of FIG. 4.

With reference to FIGS. 4-6, the treatment device 120 includes a sample collector in the form of a collar 224 fixed within the outlet passage 208 proximate the second sensor port 220 (FIG. 4). The collar 224 includes a tubular body 228, a first flange 232 defining an upstream end 236 of the collar 224, and a second flange 240 opposite the first flange 232 and defining a downstream end 244 of the collar 224 (FIGS. 5-6). A rib 248 extends in a circumferential direction around the body 228 at a position between the first flange 232 and the second flange 240.

Referring to FIG. 4, the first flange 232, second flange 240, and rib 248 each project radially outwardly with respect to the body 228 of the collar 224 and engage an interior surface 252 of the outlet passage 208. As such, the body 228 is spaced radially-inwardly from the interior surface 252 of the outlet passage 208. Thus, the collar 224 and outlet passage 208 define a first chamber 256 extending axially between the first flange 232 and the rib 248, and radially between the body 228 and the interior surface 252. The collar 224 and outlet passage 208 further define a second chamber 260 extending axially between the rib 248 and the second flange 240, and radially between the body 228 and the interior surface 252.

Referring to FIG. 6, the rib 248 includes a first end 248*a* and a second end 248*b* spaced from the first end 248*a* in the circumferential direction of the collar 224 to define a gap G therebetween. The gap G provides fluid communication between the first chamber 256 and the second chamber 260 (FIG. 4). The first flange 232 includes a plurality of cut-outs 264, spaced about the circumference of the first flange 232, which act as inlets into the first chamber 256. The second flange 240 includes an indentation 268, which acts as an outlet opening from the second chamber 260. As described in greater detail below, exhaust gas flowing through the outlet passage 208 of the treatment device 120 may enter the first chamber 256 through the cut-outs 264, flow into the second chamber 260 through the gap G, and finally flow out of the second chamber 260 through the indentation 268. The second sensor port 220 is aligned with the indentation 268 such that the NOx concentration sensor 154 (FIG. 1) extends into the indentation 268 to sample gas exiting the second chamber 260.

Referring to FIG. 1, in operation, untreated exhaust from the internal combustion engine 10 is directed into the exhaust pathway 104 at the inlet 108. The exhaust then flows through the turbocharger 116, which turns a compressor to feed compressed air back to the engine 10. After flowing through the turbocharger 116, the exhaust gas flows into the treatment device 120 through the inlet passage 204. The ECU 148 monitors the temperature sensor 152, and then commands the distributor 144 to supply reductant to the injector 140 once the temperature sensor 152 indicates that the treatment device 120 is sufficiently warm to allow for SCR reactions. The mixture of reductant and exhaust then enters the first treatment element 122. The reductant reacts with NOx in the presence of the catalyst of the SCR+F element to form nitrogen and water, while soot is captured on the porous filter substrate. The partially treated exhaust then enters the second treatment element 124, where the reductant reacts with any remaining $NO_x$ in the SCR element, and any unreacted reductant is subsequently oxidized by the AOC. Of course, in other embodiments in which the first treatment element 122 and second treatment element 124 have other configurations, the treatment process for the exhaust gas may vary. The treated exhaust exits the treatment device 120 through the outlet passage 208.

The ECU 148 may receive feedback from the $NO_x$ concentration sensor 154 and modulate the distributor 144 accordingly in order to maintain a target level of $NO_x$ and/or reductant (e.g., ammonia) downstream of the second treatment element 124. However, reductant injection may lead to non-uniform variations in the composition of the exhaust gas at different locations in the exhaust stream. In order to obtain an accurate measurement of $NO_x$ concentration, or other measured characteristics of the exhaust gas determined by the sensor 154, it is advantageous for the sensor 154 to measure a uniformly mixed sample of exhaust gas.

The collar 224 improves the accuracy of the $NO_x$ concentration sensor 154 by collecting samples of exhaust gas from multiple points around the inner periphery of the outlet passage 208, and then mixing the multiple incoming sample streams and directing the mixed sample to the sensor 154. More specifically, as shown in FIG. 5, exhaust gas enters the first chamber 256 in an axial direction, through each of the circumferentially spaced cut-outs 264. The exhaust then changes direction and flows in a circumferential direction toward the gap G in the rib 248 (FIG. 6). The exhaust again changes direction to flow axially through the gap G. Because the gap G is misaligned with the indentation 268, the exhaust changes direction for a third time to flow in a circumferential direction toward the indentation. The multiple changes in direction form a tortuous flow path that mixes the incoming exhaust sample before it reaches the indentation 268 where the sensor 154 is located.

The collar 224 may be inexpensively formed from a single piece of sheet material suitable for withstanding a high temperature exhaust environment (e.g., stainless steel sheet). In addition, unlike mixing plates, which may project inwardly into the exhaust gas pathway to create turbulence, the collar 224 adds minimal flow resistance and back pressure to the exhaust gas treatment system 100, thereby improving efficiency.

Various features of the disclosure are set forth in the following claims.

What is claimed is:

1. An exhaust gas sample collector comprising:
a collar including a tubular body, a first flange defining an upstream end of the collar, and a second flange defining a downstream end of the collar opposite the upstream end, the collar positionable within an exhaust gas pathway such that exhaust gas is able to pass through the tubular body from the upstream end to the downstream end along an inner side of the tubular body;
a plurality of inlet openings circumferentially spaced about an outer periphery of the first flange at the upstream end, the plurality of inlet openings configured to receive a sample of the exhaust gas;
an outlet in fluid communication with the plurality of inlet openings such that the sample of the exhaust gas flows from the plurality of inlet openings to the outlet along an outer side of the tubular body; and a sensor configured to measure a characteristic of the sample of the exhaust gas at the outlet.

2. The exhaust gas sample collector of claim 1, further comprising a rib located between the plurality of inlet openings and the outlet.

3. The exhaust gas sample collector of claim 2, further comprising a tortuous pathway from the plurality of inlet openings to the outlet.

4. The exhaust gas sample collector of claim 2, wherein the rib positioned between the first flange and the second flange.

5. The exhaust gas sample collector of claim 4, wherein a first chamber is defined between the first flange and the rib, and a second chamber is defined between the second flange and the rib.

6. The exhaust gas sample collector of claim 5, wherein the rib includes a gap, and wherein the first chamber is in fluid communication with the second chamber through the gap.

7. The exhaust gas sample collector of claim 6, wherein the exhaust gas sample collector is configured such that the sample of the exhaust gas flows from the plurality of inlet openings into the first chamber, and then into the second chamber through the gap before flowing through the outlet.

8. The exhaust gas sample collector of claim 1, wherein the plurality of inlet openings is formed in the first flange.

9. The exhaust gas sample collector of claim 3, wherein the tortuous pathway is configured such that the sample of the exhaust gas changes direction at least three times when flowing along the tortuous pathway.

10. The exhaust gas sample collector of claim 1, wherein the sensor is a $NO_x$ concentration sensor.

11. An exhaust gas sample collector comprising:
a first flange including a plurality of inlet openings configured to receive exhaust gas, wherein each of the plurality of inlet openings is circumferentially spaced from an adjacent one of the plurality of inlet openings;
a second flange opposite the first flange;
an outlet in fluid communication with the plurality of inlet openings;
a rib positioned between the first flange and the second flange such that a first chamber is defined between the first flange and the rib, and a second chamber is defined between the second flange and the rib; and
a sensor configured to measure a characteristic of the sample at the outlet.

12. The exhaust gas sample collector of claim 11, wherein the sensor is a $NO_x$ concentration sensor.

13. The exhaust gas sample collector of claim 11, wherein the rib includes a gap providing fluid communication between the first chamber and the second chamber.

14. The exhaust gas sample collector of claim 13, further comprising a tortuous pathway extending between the plurality of inlet openings and the outlet, wherein the exhaust gas is configured to flow along the tortuous pathway through the first chamber, the gap, and the second chamber before reaching the outlet.

15. The exhaust gas sample collector of claim 14, wherein the exhaust gas changes direction at least three times when flowing along the tortuous pathway.

16. The exhaust gas sample collector of claim 11, wherein the exhaust gas sample collector is configured to be inserted into an outlet passage of a treatment device including an SCR element.

17. An exhaust gas treatment system including an exhaust gas pathway configured to receive exhaust gas from an internal combustion engine, the exhaust gas treatment system comprising:
a reductant injector configured to inject a reductant into the exhaust gas pathway;
a treatment device including an SCR element positioned downstream of the reductant injector, the SCR element configured to reduce $NO_x$ from the exhaust gas;
the exhaust gas sample collector of claim 12; and
a controller in communication with the sensor and the reductant injector, wherein the controller is configured to control operation of the reductant injector based on feedback from the sensor.

18. The exhaust gas treatment system of claim 17, wherein the exhaust gas sample collector is positioned within an outlet passage of the treatment device.

* * * * *